(12) United States Patent
Wang

(10) Patent No.: US 6,508,281 B1
(45) Date of Patent: Jan. 21, 2003

(54) ADJUSTABLE AND EXTENDIBLE PLATFORM FOR WORKING TABLE

(76) Inventor: Tian Wang Wang, No. 45, Yi Chang East Road, Taiping City, Taichung Hsien 411 (TW)

( * ) Notice: Subject to any disclaimer, the term of this patent is extended or adjusted under 35 U.S.C. 154(b) by 0 days.

(21) Appl. No.: 09/906,905

(22) Filed: Jul. 19, 2001

(51) Int. Cl.⁷ .................................................. B25H 1/00
(52) U.S. Cl. ...................................... 144/287; 83/477.2
(58) Field of Search .......................... 144/286.1, 286.5, 144/287; 108/143; 83/477, 477.2

(56) References Cited

U.S. PATENT DOCUMENTS

| | | | | |
|---|---|---|---|---|
| 2,937,765 A | * | 5/1960 | Shank | 108/143 |
| 4,161,974 A | * | 7/1979 | Patterson | 108/142 |
| 4,964,450 A | * | 10/1990 | Hughes et al. | 144/286.5 |
| 5,379,816 A | * | 1/1995 | Charlton | 108/69 |
| 6,021,908 A | * | 2/2000 | Mathews | 211/153 |
| 6,189,429 B1 | * | 2/2001 | Liu | 108/143 |

* cited by examiner

*Primary Examiner*—Allen Ostrager
*Assistant Examiner*—Shelley Self
(74) *Attorney, Agent, or Firm*—Charles E. Baxley

(57) ABSTRACT

A platform device for attaching to a working table includes a pair of rails slidably supported on a base, and a plate slidably supported on the rails. The base has one or more guide members and/or rollers slidably engaged in the rails for guiding the rails to slide relative to the base. Two or more wheels are secured to the plate and may engage and force the rails to move relative to the base. The plate includes two end panels slidably engaged on the rails, and each having a notch. Two offset stops may engage through the notch of different end panels.

2 Claims, 7 Drawing Sheets

ADJUSTABLE AND EXTENDIBLE PLATFORM FOR WORKING TABLE

BACKGROUND OF THE INVENTION

1. Field of the Invention

The present invention relates to a working table, and more particularly to an adjustable and extendable platform assembly for a working table.

2. Description of the Prior Art

Typical working tables comprise a table provided and supported on top of a foot support or the like for supporting the tool members, and/or the work pieces. Normally, the table includes a solid configuration or area that may not be expanded or extended or adjusted. When the longer or wider work pieces are required to be supported on the table and to be worked or machined by the tool members, the table may not be used for stably supporting the work pieces. Additional support members or devices are further required to be provided and disposed beside the working table for supporting the portions of the work pieces that are extended outward beyond the table. It is inconvenient to prepare and assemble and dispose the additional support members for supporting the work pieces. In addition, it takes a long time to adjust the additional support members to a height equal to that of the table.

The present invention has arisen to mitigate and/or obviate the afore-described disadvantages of the conventional working tables.

SUMMARY OF THE INVENTION

The primary objective of the present invention is to provide an adjustable and extendable platform assembly for attaching to a working table and for being slidable and extendable laterally relative to the working table for supporting the portions of the work pieces that are extended outward beyond the working table.

In accordance with one aspect of the invention, there is provided a platform assembly for attaching to a working table or the like, the platform assembly comprising a base, a pair of rails slidably supported on the base, a plate slidably supported on the rails, and means for limiting a movement of the plate relative to the rails and the base.

The base includes a pair of grooves formed therein for slidably receiving the rails respectively.

A device is provided for guiding the rails to slide relative to the base and includes a channel formed in each of the rails, and at least two guide members secured on the base and slidably engaged in the channels of the rails respectively. One or more rollers may further be provided and engaged in each of the channels of the rails.

The rails includes two ends each having a pin secured thereto and extended outward therefrom, the plate includes a pair of blocks secured thereto and each having a duct formed therein for slidably receiving the rails respectively, the blocks are engageable with the pins respectively for forcing the rails to move relative to the base.

The plate includes two end panels each having a passage formed therein for slidably receiving the rails and the pin.

The base includes a first end having a first stop provided thereon, and a second end having a second stop provided thereon and offset from the first stop, a first of the end panels includes a first notch formed therein for receiving the first stop and for engaging with the second stop, a second of the end panels includes a second notch formed therein for receiving the second stop and for engaging with the first stop, Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
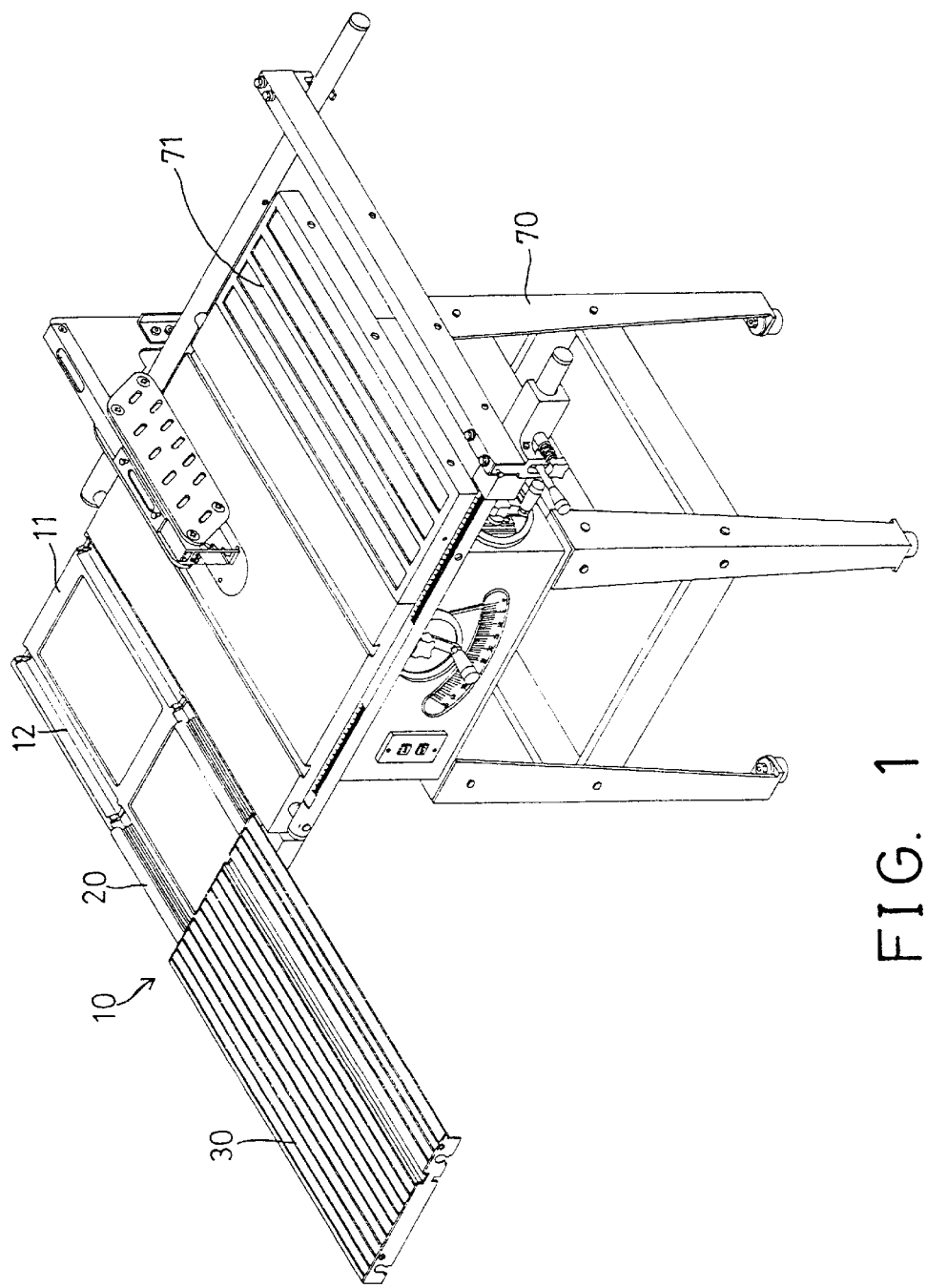
FIG. 1 is a perspective view of a working table having an adjustable and extendable platform assembly in accordance with the present invention.
Figure 2:
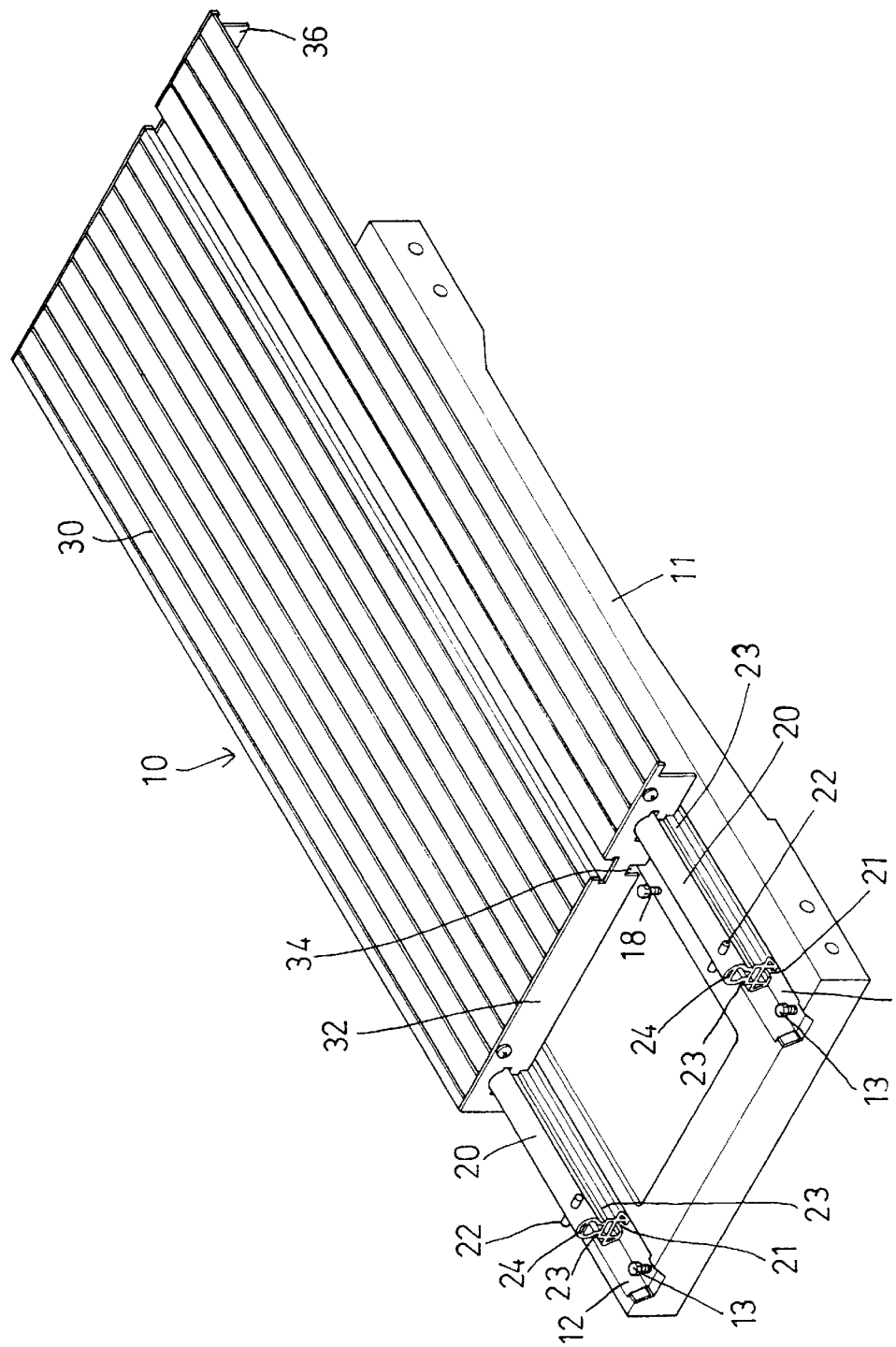
FIG. 2 is a perspective view of the adjustable and extendable platform assembly for the working table.
Figure 3:
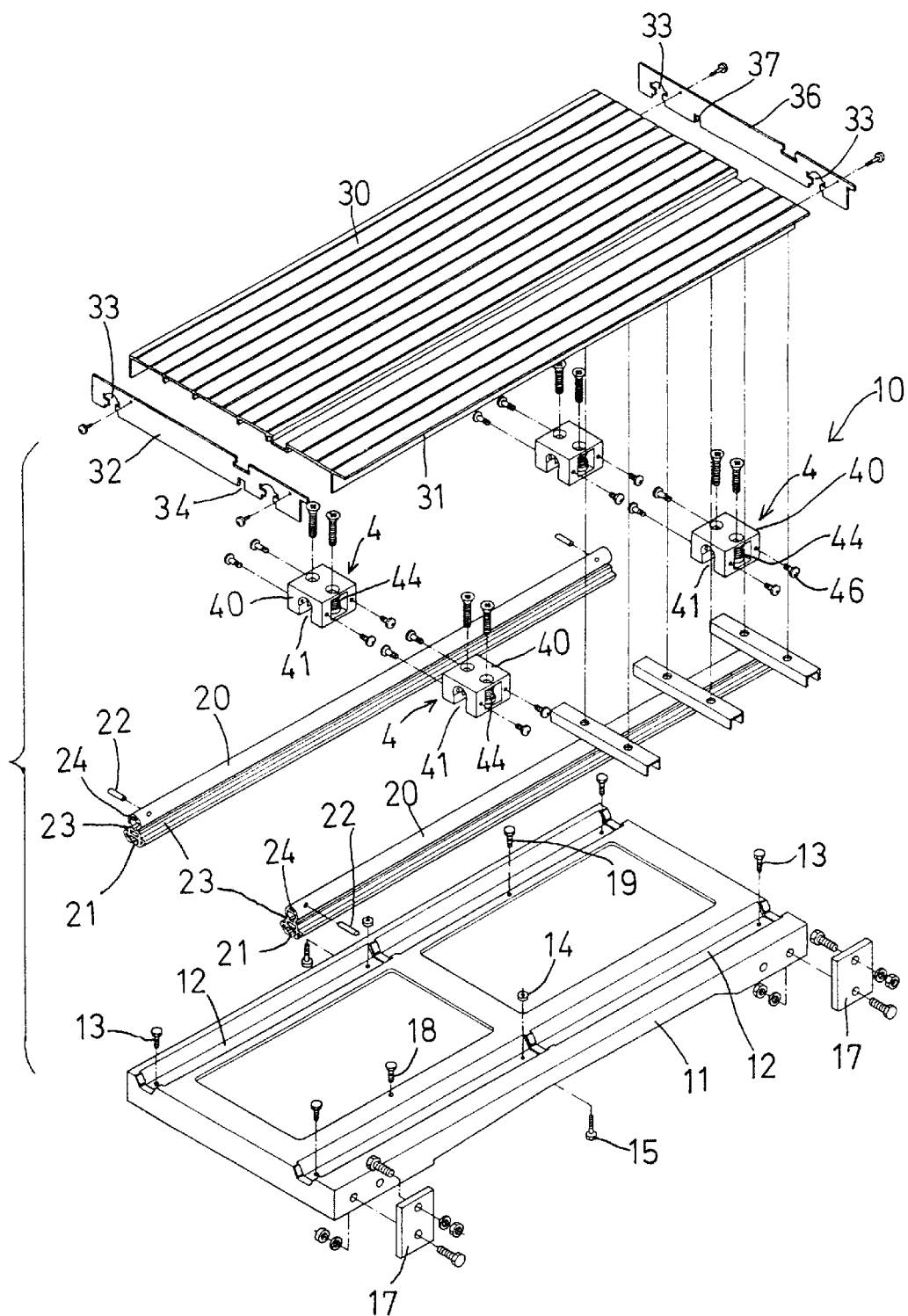
FIG. 3 is an exploded view of the adjustable and extendable platform assembly for the working table.
Figure 4:
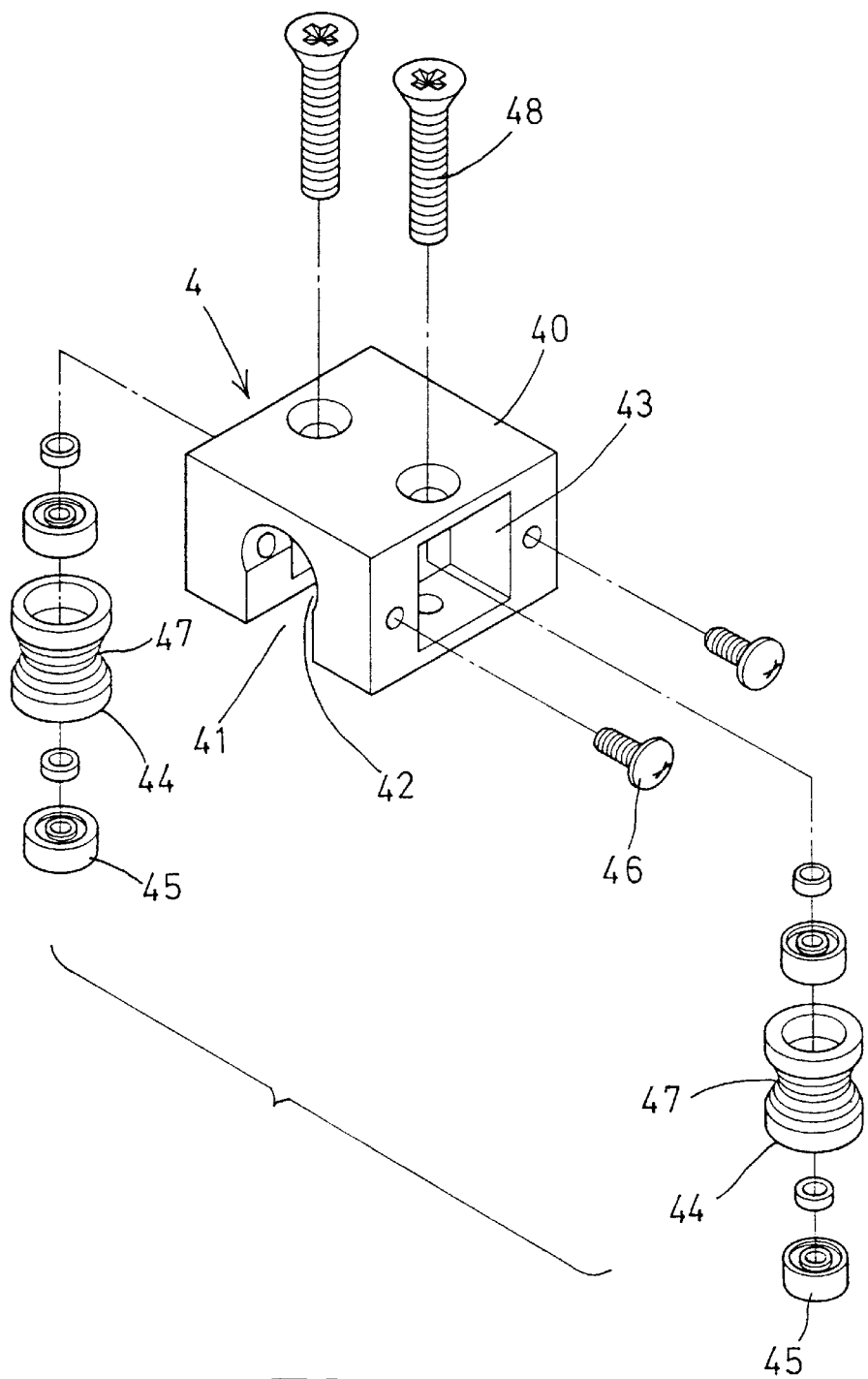
FIG. 4 is an exploded view of a sliding support of the table plate.
Figure 9:
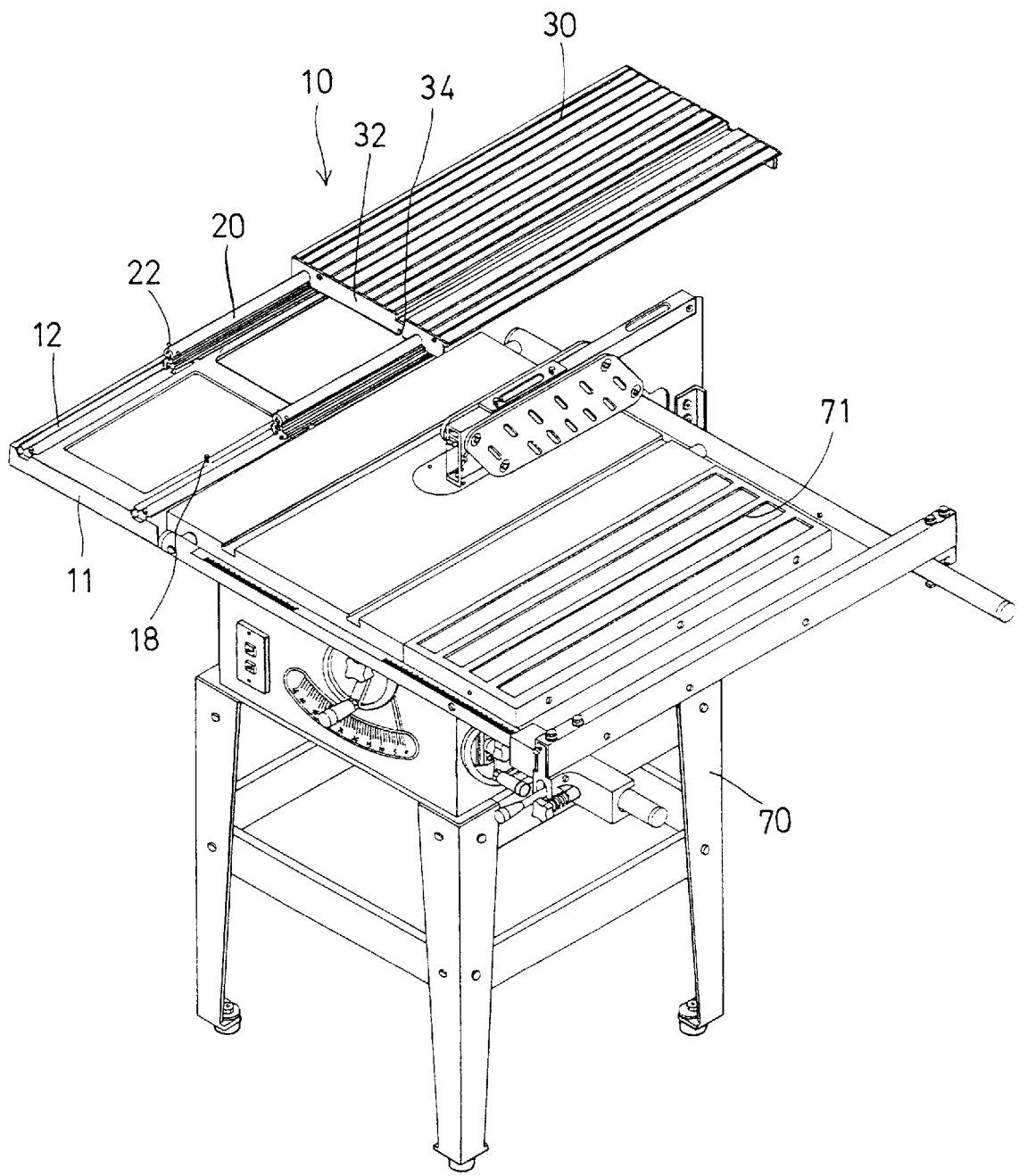
FIG. 9 is a perspective view illustrating the operation of the adjustable and extendable platform assembly for the working table.

Referring to the drawings, and initially to FIGS. 1 and 9, an adjustable and extendable platform assembly 10 in accordance with the present invention may be provided for attaching or mounting onto an object, such as a working table as shown in FIGS. 1 and 9. The working table comprises a platform 71 provided on top of the foot support 70 thereof, for supporting various kinds of work pieces and/or tool members, such as the table saw blades, etc. The adjustable and extendable platform assembly may be attached or mounted or assembled onto the ends or the sides of the platform 71 for extending laterally or longitudinally away from the platform 71 and for supporting the portions of the work pieces that are extended laterally or longitudinally outward beyond the working table.

Referring next to FIGS. 2–5, and again to FIG. 1, the adjustable and extendable platform assembly 10 includes a base 11 which may be mounted or assembled onto the ends or the sides of the platform 71 with bars 17 or the like. The base 11 includes one or more, such as two grooves 12 formed therein, and parallel to each other, and parallel to the longitudinal axis or direction of the base 11. One or more guide members 13 are secured in each of the ends of the grooves 12 of the base 11, and one or more rollers 14 are rotatably secured in the middle portion of each of the grooves 12 of the base 11 respectively, with fasteners 15 or the like. A stop 18 is secured on one end and one side of the base 11, and another stop 18 is secured on the other end and the other side of the base 11, opposite or offset from the stop 18.

One or mores such as two rails 20 are slidably received in the grooves 12 of the base 11 respectively, and each includes a channel 21 formed in the bottom thereof for slidably receiving the guide members 13 and the rollers 14 and for guiding the rails 20 to slide along the grooves 12 of the base 11. The channels 21 of the rails 20 and the guide members 13 preferably include a corresponding or mating T-shape, for allowing the guide members 13 and the rollers 14 to be stably and solidly retained in the channels 21 of the rails 20 respectively, and for preventing the rails 20 from being disengaged from the base 11. The rails 20 each includes a pin 22 secured to each of the ends thereof and slightly and laterally extended outward therefrom, and each includes two longitudinal recesses 23 formed in the sides thereof for forming or defining a relatively enlarged track 24 on top thereof.

A table plate 30 includes one or more ribs or flaps 31 extended downward therefrom, and includes two ends each having a panel 32, 36 secured thereto and extended or dependent downward therefrom. The panels 32, 36 each includes two passages 33 formed therein for slidably receiving the tracks 24 of the rails 20 and for allowing and guiding the plate 30 to move or to slide along the rails 20 and the tracks 24. The end panel 32 includes a notch 34 formed therein and aligned with the stop 18 (FIG. 2), for allowing the stop 18 to be movable through the notch 34 of the panel 32 and for allowing the end panel 32 to be moved beyond or bypass or through the stop 18. The notch 34 of the panel 32 is offset from the stop 19, such that the stop 19 may not be moved beyond or through or bypass the end panel 32. The other end panel 36 includes a notch 37 formed therein and offset from the stop 18, but aligned with the stop 19, for allowing the stop 19 to be movable through the notch 37 of the panel 36 and for allowing the end panel 36 to be moved beyond or bypass the stop 19. The notch 37 of the panel 36 is offset from the stop 18, such that the stop 18 may not be moved beyond or through or bypass the end panel 36.

Two or more, such as two pairs of sliding supports 4 each includes a block 40 secured to the bottom of the plate 30, particularly secured to the ribs or flaps 31 of the plate 30, with fasteners 46, for example. The blocks 40 each includes a duct 41 formed therein for slidably receiving the rails 20 and an enlarged conduit 42 formed therein and communicating with the duct 41 thereof for receiving the tracks 24 respectively, and for guiding the blocks 40 and thus the plate 30 to move or to slide along the rails 20. The blocks 40 each includes one or more side openings 43 formed therein for rotatably receiving a roller or a wheel 44 therein respectively, with a fastener or a pivot axle 48, and/or with bearings 45. The wheels 44 each includes a peripheral depression 47 formed therein for receiving the sides of the tracks 24 and for smoothly guiding the blocks 40 and thus the plate 30 to move and to slide along the tracks 24 and the rails 20.

Figure 5:
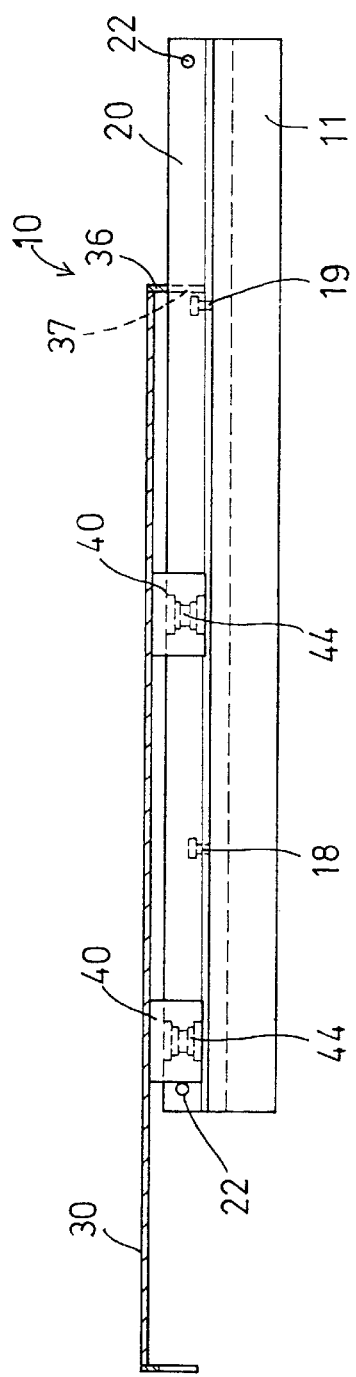
FIGS. 5, 6, 7, 8 are plane schematic views illustrating the operation of the adjustable and extendable platform assembly for the working table.
Figure 6:
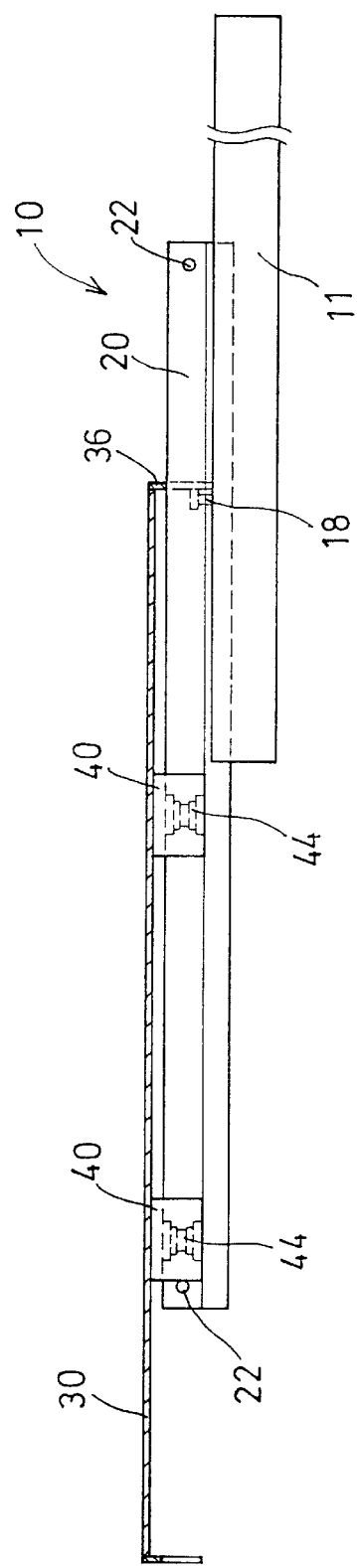

In operation, as shown in FIGS. 1, 5, 6, and 2, when the end panel 32 of the plate 30 is moved toward the stop 18 and moved leftward relative to the base 11 and the tracks 24, the stop 18 may be moved through the notch 34 of the end panel 32, such that the plate 30 may be moved leftward beyond the rails 20 (FIG. 5). When one of the blocks 40 of the sliding supports 4 is engaged with pin(s) 22 of the rails 20 (FIGS. 5, 6), the rails 20 may be forced to move outward of the base 11 by the plate 30. When the other end panel 36 is engaged with the stop 18 (FIG. 6), the end panel 36 may not move beyond the stop 18, such that the leftward movement of the plate 30 and the rails 20 relative to the base 11 is limited.

Figure 7:
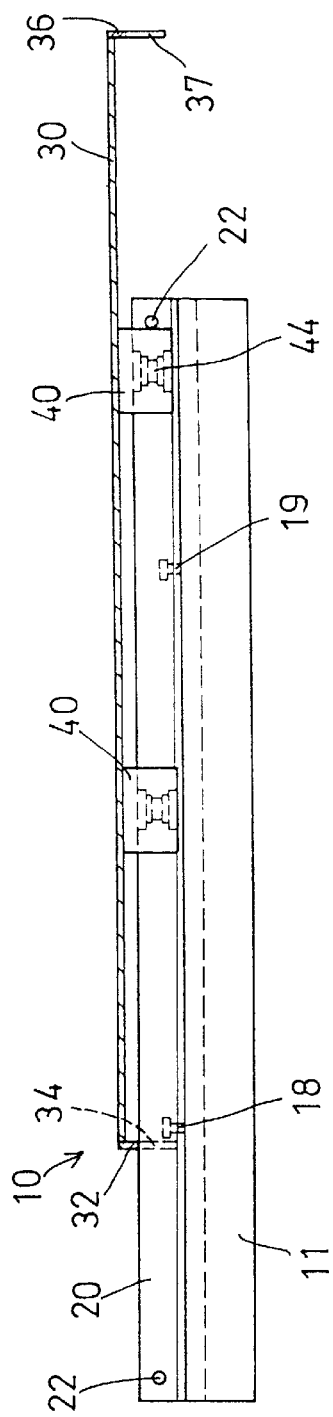
Figure 8:
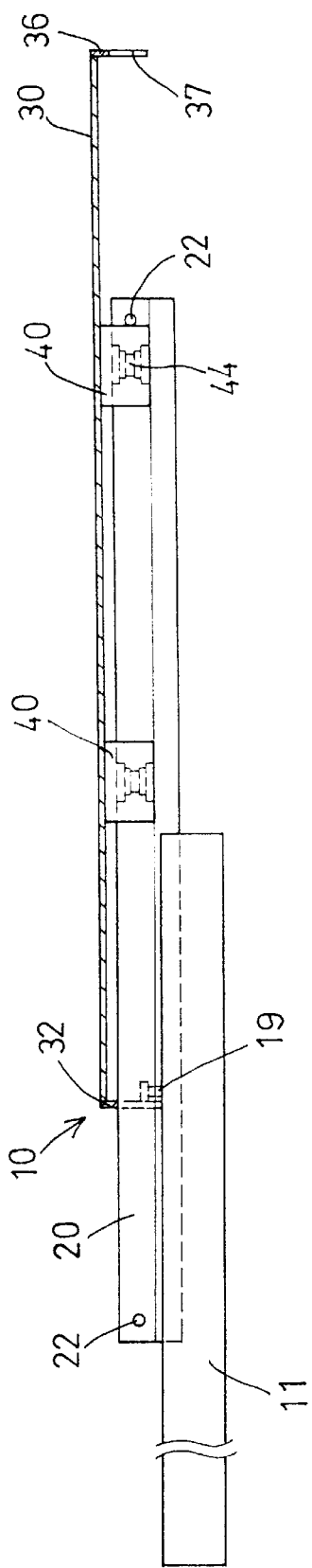

As shown in FIGS. 7, 8, and 9, the stop 19 may be moved through the notch 37 of the end panel 36, such that the end panel 36 may be moved beyond the stop 19 and such that the plate 30 may be moved rightward beyond the rails 20 (FIG. 7). When one of the blocks 40 of the sliding supports 4 is engaged with pin(s) 22 of the rails 20 (FIGS. 7, 8), the rails 20 may be forced to move outward and rightward of the base 11 by the plate 30. When the other end panel 32 is engaged with the stop 19 (FIG. 8), the end panel 32 may not move beyond the stop 19, such that the rightward movement of the plate 30 and the rails 20 relative to the base 11 is limited. The plate 30 may thus be moved leftward (FIG. 1) or rightward (FIG. 9) beyond the base 11 and the platform 71.

When the base 11 is secured to the platform 71 in the other direction, or in a direction perpendicular to that shown in FIGS. 1 and 9, the plate 30 may be moved longitudinally away from the platform 71 for supporting longitudinal work pieces. The other lock devices (not shown) may further be provided for locking or positioning the plate 30 to the rails 20 and to the base 11, for allowing the plate 30 and the rails 20 to be positioned at any suitable or selected position relative to the base 11.

Accordingly, the adjustable and extendable platform assembly in accordance with the present invention may be attached to the working table and may be slidable and extendable laterally relative to the working table for supporting the portions of the work pieces that are extended outward beyond the working table.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A platform assembly for attaching to a working table or the like, said platform assembly comprising:

a base including a first end having a first stop provided thereon, and a second end having a second stop provided thereon and offset from said first stop, a pair of rails slidably supported on said base, said rails each including two ends, a plate slidably supported on said rails, and including a pair of blocks secured thereto and each having a duct formed therein for slidably receiving said rails respectively, said blocks being engageable with said ends of said rails respectively for limiting said plate to move relative to said rails respectively, and for allowing said plate to be extended outward beyond said ends of said rails respectively, and for forcing said rails to move relative to said base, said plate including two end panels each having a passage formed therein for slidably receiving said rails, a first of said end panels including a first notch formed therein for receiving said first stop and for allowing said first end panel to move beyond said first end of said base, said first end panel being engageable with said second stop for limiting said plate to move relative to said base, and for preventing said first end panel from moving beyond said second stop, a second of said end panels including a second notch formed therein for receiving said second stop and for allowing said second end panel to move beyond said second end of said base, said second end panel being engageable with said first stop for limiting said plate to move relative to said base, and for preventing said second end panel from moving beyond said first stop.

2. The platform assembly according to claim 1, wherein said rails each includes two ends each having a pin secured thereto and extended outward therefrom, said blocks of said plate are engageable with said pins respectively for forcing said rails to move relative to said base.

* * * * *